(12) United States Patent
Lin et al.

(10) Patent No.: US 10,967,811 B2
(45) Date of Patent: Apr. 6, 2021

(54) SOUND INSULATION COMPOSITION AND SOUND INSULATION SHEET FOR VEHICLE

(71) Applicant: BYD COMPANY LIMITED, Shenzhen (CN)

(72) Inventors: Xinping Lin, Shenzhen (CN); Min Zhang, Shenzhen (CN); Yaxuan Sun, Shenzhen (CN); Mingshuang Zhou, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 442 days.

(21) Appl. No.: 15/781,031

(22) PCT Filed: Dec. 21, 2016

(86) PCT No.: PCT/CN2016/111364
§ 371 (c)(1),
(2) Date: Jun. 1, 2018

(87) PCT Pub. No.: WO2017/107929
PCT Pub. Date: Jun. 29, 2017

(65) Prior Publication Data
US 2020/0269775 A1    Aug. 27, 2020

(30) Foreign Application Priority Data
Dec. 25, 2015 (CN) .......................... 201510991599.4

(51) Int. Cl.
| | | |
|---|---|---|
| C08L 23/06 | (2006.01) |
| B60R 13/08 | (2006.01) |
| B29C 48/00 | (2019.01) |
| C08L 23/08 | (2006.01) |
| C08L 23/12 | (2006.01) |
| C08L 51/00 | (2006.01) |
| B29K 23/00 | (2006.01) |
| C08K 3/04 | (2006.01) |
| C08K 3/26 | (2006.01) |
| C08K 3/34 | (2006.01) |
| C08K 9/00 | (2006.01) |
| C08K 3/22 | (2006.01) |
| C08K 3/30 | (2006.01) |
| C08K 3/38 | (2006.01) |

(52) U.S. Cl.
CPC ............ *B60R 13/08* (2013.01); *B29C 48/022* (2019.02); *C08L 23/06* (2013.01); *C08L 23/0853* (2013.01); *C08L 23/12* (2013.01); *C08L 51/003* (2013.01); *B29K 2023/0633* (2013.01); *B29K 2023/083* (2013.01); *B29K 2023/12* (2013.01); *C08K 3/04* (2013.01); *C08K 3/26* (2013.01); *C08K 3/34* (2013.01); *C08K 9/00* (2013.01); *C08K 2003/2224* (2013.01); *C08K 2003/2227* (2013.01); *C08K 2003/3045* (2013.01); *C08K 2003/387* (2013.01); *C08K 2201/005* (2013.01)

(58) Field of Classification Search
CPC ... B60R 13/08; B29C 48/022; C08L 23/0853; C08L 23/12; C08L 51/003
See application file for complete search history.

(56) References Cited

FOREIGN PATENT DOCUMENTS

| | | |
|---|---|---|
| CN | 1583864 A | 2/2005 |
| CN | 102844369 A | 12/2012 |
| CN | 103897262 A | 7/2014 |
| CN | 103897287 A | 7/2014 |
| CN | 104744789 A | 7/2015 |
| JP | 2013032452 A | 2/2013 |

OTHER PUBLICATIONS

The World Intellectual Property Organization (WIPO) International Search Report and Written Opinion for PCT/CN2016/111364 dated Mar. 24, 2017 6 Pages.

*Primary Examiner* — Edward J Cain
(74) *Attorney, Agent, or Firm* — Anova Law Group, PLLC

(57) ABSTRACT

A sound insulation composition and a sound insulation sheet for a vehicle are provided. The sound insulation composition includes 50 to 300 parts by weight of EVA, 10 to 300 parts by weight of mica powders, 10 to 300 parts by weight of dolomite, 10 to 50 parts by weight of thermoplastic resin, 10 to 100 parts by weight of a toughening agent, 3 to 60 parts by weight of a compatibilizer, 30 to 300 parts by weight of a fire retardant, 10 to 80 parts by weight of a plasticizer, and 100 to 500 parts by weight of barium sulfate. The sound insulation sheet for the vehicle is made of the sound insulation composition mentioned above.

17 Claims, No Drawings

SOUND INSULATION COMPOSITION AND SOUND INSULATION SHEET FOR VEHICLE

CROSS-REFERENCE TO RELATED APPLICATION

This application claims priority to and benefits of Chinese Patent Application Serial No. 201510991599.4, filed with the State Intellectual Property Office of P. R. China on Dec. 25, 2015, the entire content of which is incorporated herein by reference.

TECHNICAL FIELD

The present disclosure relates to a field of vehicle components, especially relates to a sound insulation composition and a sound insulation sheet for a vehicle.

BACKGROUND

Nowadays, since fossil energy is limited and environment problems caused by vehicle exhaust, thereby electric and hybrid vehicles are becoming new development directions. Accordingly, an electric motor and other sounding components of an electric vehicle have put forward higher requirements to NVH (Noise, Vibration, Harshness) performance of the vehicle. Especially a high frequency part of the noise is more prominent, so that it has also put forward higher requirements to noise reduction materials.

In the prior art, PVC (polyvinyl chloride) or EVA (ethylene-vinyl acetate) resins has been widely used as a substrate in a sound insulation sheet for a vehicle, the sound insulation sheet is prepared by adding a mixture of single flake fillers or common inorganic fillers. However, the sound insulation effect of such materials cannot meet the requirements of low frequency or superhigh frequency noise generated by electric vehicle for the sound insulation materials. It generally impedes the transmission of sound energy in the way of sound transmitting in the prior art, so as to achieve the effect of reducing noise.

SUMMARY

In the present disclosure, flake-shaped mica powders and block-shaped dolomite are added into a sound insulation substrate EVA at the same time, so as to increase the loss factor of sound insulation materials, limit the movement of internal molecules in the sound insulation composition, and increase a relative lag of the internal strain and stress of the sound insulation composition. Meanwhile, in such solution, internal friction of the sound insulation composition may be increased as well, thus increasing integral energy loss of the sound insulation composition. The flake-shaped mica powders and block-shaped dolomite are added in the sound insulation substrate at the same time, so as to limit relative movements among large molecules with long chains in the sound insulation composition, further increase the energy loss, thus achieving effects of vibration absorption and sound insulation.

The present disclosure aims to solve the technical problem mentioned above, and provides a sound insulation composition, including 50 to 300 parts by weight of EVA, 10-300 parts by weight of mica powders, 10 to 300 parts by weight of dolomite, 10 to 50 parts by weight of thermoplastic resin, 10 to 100 parts by weight of a toughening agent, 3 to 60 parts by weight of a compatibilizer, 30 to 300 parts by weight of a fire retardant, 10 to 80 parts by weight of a plasticizer, 100 to 500 parts by weight of barium sulfate.

The present disclosure also provides a sound insulation sheet for a vehicle, and the sound insulation sheet is made of the sound insulation composition according to present disclosure obtained by banburying, extruding and pressing.

After a lot of experiments have been done, inventors of the present disclosure found that the sound insulation sheet prepared by adding the flake-shaped mica powders and block-shaped dolomite at the same time in the EVA substrate has favorable effects of vibration absorption and sound insulation. Because the flake-shaped mica powders and block-shaped dolomite are mixed to fill the EVA substrate, the movements of internal molecules in sound insulation materials may be limited, the loss factor and relative lag of the internal strain and stress of the sound insulation material may be increased, and internal friction of sound insulation materials may also be increased, thus significantly increasing the integral energy loss of the sound insulation materials, so that the sound insulation sheet prepared by the sound insulation composition has favorable effect of sound insulation. The inventors also found that the sound insulation sheet, which is made of the sound insulation composition prepared by mixing EVA, the flaked-shaped mica powders, block-shaped dolomite, the thermoplastic resin, the toughening agent, the compatibilizer, the fire retardant, the plasticizer and barium sulfate in a ratio described by the present disclosure, not only have favorable damping effect, obvious sound absorption and vibration absorption effect, but also have favorable mechanical strength, mechanical property, favorable fire retardant property, low smoke density, meanwhile the sound insulation sheet is safe and has no smell and low cost.

DETAILED DESCRIPTION

Reference will be made in detail to embodiments of the present disclosure. The embodiments described herein are explanatory, illustrative, and used to generally understand the present disclosure. The embodiments shall not be construed to limit the present disclosure.

The present disclosure provides a sound insulation composition, includes 50 to 300 parts by weight of EVA, 10 to 300 parts by weight of mica powders, 10 to 300 parts by weight of dolomite, 10 to 50 parts by weight of thermoplastic resin, 10 to 100 parts by weight of a toughening agent, 3 to 60 parts by weight of a compatibilizer, 30 to 300 parts by weight of a fire retardant, 10 to 80 parts by weight of a plasticizer, and 100 to 500 parts by weight of barium sulfate.

The inventors found that the sound insulation composition prepared by filling flake-shaped mica powders and block-shaped dolomite in an EVA substrate, has a favorable effect of sound insulation, meanwhile the flake-shaped mica powders and block-shaped dolomite have good compatibility with EVA. Because of the presence of the thermoplastic resin and the toughening agent, the sound insulation sheet prepared by the sound insulation composition has high tensile strength and good flexibility. Because of the presence of the compatibilizer, EVA can be better mixed with the mica powders and dolomite.

In some embodiments, an average particle size of the mica powders is 80 to 1250 mesh.

In some embodiments, an average particle size of the dolomite is 80 to 1250 mesh.

The average particle size of mica powders is defined to be 80 to 1250 mesh, and the average particle size of dolomite is defined to be 80 to 1250 mesh, so as to guarantee favorable compatibility among the mica powders, dolomite and EVA, at the same time the interactions among mica powders, dolomite and EVA become more obvious, the sound insulation composition has greater energy consumption, and the sound insulation sheet prepared has favorable effect of sound insulation.

In some embodiments, a weight ratio of the mica powders to the dolomite is 1:9 to 9:1. The flake-shaped mica powders and block-shaped dolomite are controlled within such a weight ratio, so that the mica powders, dolomite and EVA may be better interacted, and the sound insulation composition has favorable damping capacity and favorable effect of sound and vibration absorption.

In some embodiments, the toughening agent is a thermoplastic elastomer of olefins. The thermoplastic elastomer of olefins is at least one of propenyl elastomers and vinyl elastomers. Alternatively, the toughening agent is propenyl elastomer and vinyl elastomer. In some embodiments, the propenyl elastomer is 10 to 50 parts by weight, the vinyl elastomer is 10 to 50 parts by weight. The propenyl elastomer and the vinyl elastomer are added into the sound insulation composition, and the propenyl elastomer is controlled to be 10 to 50 parts by weight and the vinyl elastomer is controlled to be 10 to 50 parts by weight, the sound insulation composition prepared has a better processing performance, and the sound insulation sheet prepared has better flexibility and other mechanical properties.

In some embodiments, the thermoplastic resin is selected from one or more of a copolymer of polyethylene and polypropylene, a linear low density polyethylene, and a polypropylene. Alternatively, the thermoplastic resin is linear low density polyethylene, which may improve a processing property of the sound insulation composition, and hardness and other mechanical property of the sound insulation sheet.

In some embodiments, the plasticizer is paraffin oil, so as to improve the processing property of the sound insulation composition and increase the hardness of the sound insulation sheet.

In some embodiments, the sound insulation composition according to present disclosure further includes 5 to 20 parts by weight of carbon black. The carbon black used as a pigment is safe, and has no smell, no pollution and low cost.

In some embodiments, the compatibilizer is at least one of EVA grafted with maleic anhydride and EVA grafted with glycidyl methacrylate. Alternatively, the compatibilizer is EVA grafted with maleic anhydride, so as to further improve the compatibility of inorganic fillers and the EVA substrate, and make the inorganic fillers disperse more evenly in the EVA substrate.

In some embodiments, the fire retardant is a halogen-free fire retardant. In some embodiments, the halogen-free fire retardant can be selected from one or more of zinc borate, magnesium hydroxide and aluminum hydroxide. This kind of fire retardant used can achieve low odor, low smoke density and a high fire retardant grade, meanwhile can further improve the problems of processing difficulties of high filled sound insulation composition, and improve the problems of poor mechanical properties and low acoustic insulation mass of the sound insulation sheet.

In some embodiments, the sound insulation composition according to present disclosure may further include an assistant. In some embodiments, the assistant may be selected from one or more of a softener, an antioxidant and a lubricant according to actual situations. The types and the amounts of the softener, the antioxidant and the lubricant are within a general range of this field, which are not limited in present disclosure and are no more described in detail.

The present disclosure also provides a sound insulation sheet for a vehicle, the sound insulation sheet is prepared by banburying, extruding and pressing the sound insulation composition according to present disclosure. In the process of banburying, the inorganic fillers, auxiliary agent and the EVA substrate are sufficiently mixed and dispersed. In the process of extruding and pressing, the sound insulation sheet with uniform thickness may be obtained. In some embodiments, a surface pretreatment of dolomite is carried out before banburying. In some embodiments, the method of surface pretreatment of dolomite is mixing dolomite, barium sulfate and a silane coupling agent in an electric heating high speed mixing machine at a mixing temperature of 100 to 120° C. for a mixing time of 0.5 to 1 h.

Specifically, a banburying condition includes; a banburying temperature is 140 to 160° C., a banburying time is 10 to 15 min. An extruding condition includes: an extruding temperature is 140 to 160° C.

In some embodiments, the sound insulation sheet according to present disclosure may be prepared as follows: specifically, dolomite, barium sulfate and the silane coupling agent are first mixed in a mixing machine and the surface pretreatment of dolomite is accomplished in the process of mixing; then, the plasticizer and the mica powders after being evenly mixed are transferred in a banburying machine together with EVA, the compatibilizer, the thermoplastic resin, the fire retardant, and the toughening agent to perform banburying; mixture after banburying is extruded, thus obtaining a sheet is obtained, in which, a banburying temperature is 140 to 160° C., a banburying time is 10 min to 15 min; an extruding condition includes: an extruding temperature is 140° C. to 160° C.

The aforementioned features and advantages of the present disclosure as well as the additional features and advantages thereof will be further clearly understood hereafter as a result of a detailed description of the following embodiments.

Example 1

(1) 6 kg dolomite (an average particle size of dolomite is 200 mesh), 40 kg barium sulfate and 0.5 kg silane coupling agent were weighed and mixed in a mixing machine at a temperature of 110° C. for 5 min.

(2) 10 kg mica powders (an average particle size of the mica powders is 325 mesh), 3 kg paraffin oil were weighed and mixed evenly in a plastic container.

(3) 10 kg EVA, 5 kg propenyl elastomer (Vistamaxx 6102), 3 kg vinyl elastomer (Engage8150), 2 kg linear low density polyethylene (LLDPE GA574-000), 1 kg EVA grafted with maleic anhydride, 10 kg fire retardant (including 6 kg zinc borate, 2 kg magnesium hydroxide, 2 kg aluminum hydroxide), 1 kg carbon black, and 2.3 kg a mixture of stearic acid, zinc stearate, calcium oxide and inhibitor (dilauryl thiodipropionate) were weighed, disposed in a banburying machine together with mixtures of the step (1) and step (2) to perform banburying, in which a temperature in the banburying machine was set at 150° C. and a banburying time was set for 15 min.

(4) Mixture obtained after banburying in step (3) was fed automatically in a double forced feeding hopper, and extruded to be a sheet at a temperature of 160° C., and the extruded sheet was pressed and polished by a calender so as to obtain a sample having a thickness of 2 mm and a width of 1.5 m. Then the sample was cut into a size of 1.5 m×10 m, thus obtaining a sound insulation sheet A1 of Example 1.

Example 2

A method used to prepare the sound insulation sheet A2 of Example 2 is the same as Example 1 expect for differences that the average particle size of dolomite in step (1) is 325 mesh and the average particle size of the mica powders in step (2) is 600 mesh.

Example 3

A method used to prepare the sound insulation sheet A3 of Example 3 is the same as Example 1 expect for differences that the average particle size of dolomite in step (1) is 600 mesh and the average particle size of the mica powders in step (2) is 800 mesh.

Example 4

A method used to prepare the sound insulation sheet A4 of Example 4 is the same as Example 1 expect for differences that the weight of dolomite is 4 kg and the weight of the barium sulfate is 40 kg in step (1), the weight of mica powders is 12 kg in step (2), and the weight of EVA is 10 kg, the weight of propenyl elastomer (Vistamaxx 6102) is 8 kg and the weight of linear low density polyethylene (LLDPE 7144) is 2 kg in step (3). The other preparation conditions are the same as the Example 1.

Example 5

A method used to prepare the sound insulation sheet A5 of Example 5 is the same as Example 1 expect for differences that the weight of dolomite is 8 kg and the weight of barium sulfate is 40 kg in step (1), the weight of the mica powders is 8 kg in step (2), and the weight of EVA is 10 kg, the weight of vinyl elastomer (Engage8150) is 8 kg, the weight of linear low density polyethylene (LLDPE 7144) is 4 kg in step (3). The other conditions are the same as the Example 1.

Example 6

A method used to prepare the sound insulation sheet A6 of Example 6 is the same as Example 1 expect for differences that the weight of the EVA is 12 kg, the weight of propenyl elastomer (Vistamaxx 6102) is 6.7 kg and the weight of linear low density polyethylene (LLDPE 7144) is 1.7 kg in step (3). The other preparation conditions are the same as the Example 1.

Example 7

A method used to prepare the sound insulation sheet A7 of Example 7 is the same as Example 1 expect for differences that the weight of dolomite is 2 kg and the average particle size of dolomite is 80 mesh in step (1) and the weight of the mica powders is 18 kg and the average particle size of the mica powders is 1250 mesh in step (2). The other preparation conditions are the same as the Example 1.

Example 8

A method used to prepare the sound insulation sheet A8 of Example 8 is the same as Example 1 expect for differences that the weight of dolomite is 18 kg and the average particle size of dolomite is 1250 mesh in step (1), the weight of the mica powders is 2 kg and the average particle size of the mica powders is 80 mesh in step (2). The other preparation conditions are the same as the Example 1.

Example 9

A method used to prepare the sound insulation sheet A9 of Example 9 is the same as Example 1 expect for differences that the weight of dolomite is 2 kg and the average particle size of dolomite is 80 mesh in step (1), the weight of the mica powders is 18 kg and the average particle size of the mica powders is 80 mesh in step (2). The other preparation conditions are the same as the example 1.

Example 10

A method used to prepare the sound insulation sheet A10 of Example 10 is the same as Example 1 expect for differences that the weight of dolomite is 18 kg and the average particle size of dolomite is 1500 mesh in step (1), the weight of the mica powders is 2 kg and the average particle size of the mica powders is 1500 mesh in step (2). The other preparation conditions are the same as the Example 1.

Comparative Example 1

10 kg EVA, 5 kg propenyl elastomer (Vistamaxx 6102), 3 kg vinyl elastomer (Engage8150), 2 kg linear low density polyethylene (LLDPE 7144), 40 kg barium sulfate, 10 kg calcium carbonate, 10 kg magnesium hydroxide, 3 kg paraffin oil, 1 kg carbon black, and 2.3 kg mixture of stearic acid, zinc stearate, calcium oxide and inhibitor (dilauryl thiodipropionate) were weighed and disposed in a banburying machine to perform banburying, in which a temperature of the banburying machine was set at 150° C. and a banburying time was set for 15 min. Mixture obtained after banburying was fed automatically in a double forced feeding hopper, and extruded to be a sheet at a temperature of 160° C., and the extruded sheet was pressed and polished by a calender so as to obtain a sample having a thickness of 2 mm and a width of 1.5 m. Then the sample was cut into a size of 1.5 m×10 m, thus obtaining the sound insulation sheet DA1 of Comparative Example 1.

Comparative Example 2

A method used to prepare the sound insulation sheet DA2 of Comparative Example 2 is the same as Comparative Example 1 expect for a difference that there is no addition of dolomite.

Comparative Example 3

A method used to prepare the sound insulation sheet DA3 of Comparative Example 3 is the same as Comparative Example 1 expect for a difference that there is no addition of mica powders.

Performance Tests (1) Acoustic Insulation Mass Measurement

Sound insulation performances of the sound insulation sheets A1 to A10 and DA1 to DA3 are measured according to a method disclosed in accordance with GB/T 18696.2-2002. Measuring results are shown in Table 1.

(2) Tensile Strength Measurement

Tensile strengths of the sound insulation sheets A1 to A10 and DA1 to DA3 are measured according to a method disclosed in accordance with GB/T 1040-2006. Measuring results are shown in Table 2.

(3) Combustion Performance Measurement

Combustion performances of the sound insulation sheets A1 to A10 and DA1 to DA3 are measured according to a method disclosed in accordance with GB/T 8410-2006. Measuring results are shown in Table 2.

(4) Oxygen Index Measurement

Oxygen indexes of the sound insulation sheets A1 to A10 and DA1 to DA3 are measured according to an oxygen index method for plastics disclosed in accordance with GB/T2406.2-2009. Measuring results are shown in Table 2.

(5) Smoke Density Measurement

Smoke densities of the sound insulation sheets A1 to A10 and DA1 to DA3 are measured according to an experimental method of smoke density for burning or decomposing building materials disclosed in accordance with GB/T8627-2007. Measuring results are shown in Table 2.

TABLE 1

| $\frac{1}{3}$ octave mid frequency (HZ) | Acoustic Insulation Mass (db) | | | | | | | | | | | | |
|---|---|---|---|---|---|---|---|---|---|---|---|---|---|
| | A1 | A2 | A3 | A4 | A5 | A6 | A7 | A8 | A9 | A10 | DA1 | DA2 | DA3 |
| 250 | 19.16 | 14.20 | 17.96 | 14.04 | 16.62 | 12.84 | 10.6 | 15.3 | 15.38 | 9.88 | 16.29 | 11.87 | 16.54 |
| 315 | 22.27 | 18.20 | 20.94 | 18.67 | 15.19 | 17.75 | 13.7 | 15.22 | 21.05 | 15.72 | 21.40 | 16.99 | 21.2 |
| 400 | 26.66 | 22.50 | 24.64 | 23.08 | 21.48 | 22.76 | 21.2 | 23.38 | 26.17 | 21.87 | 26.35 | 24.07 | 25.94 |
| 500 | 27.81 | 26.59 | 26.99 | 27.99 | 21.28 | 26.91 | 25.5 | 27.53 | 30.15 | 23.2 | 30.29 | 28.75 | 29.7 |
| 630 | 24.89 | 24.06 | 22.60 | 26.58 | 24.41 | 23.86 | 32.7 | 30.28 | 34.07 | 23.63 | 33.85 | 32.22 | 33.4 |
| 800 | 28.9 | 28.01 | 25.95 | 27.75 | 28.31 | 28.03 | 28.5 | 31.83 | 38.06 | 27.44 | 37.75 | 36.96 | 35.73 |
| 1000 | 32.71 | 31.38 | 29.08 | 31.96 | 30.04 | 31.35 | 28.5 | 33.80 | 30.75 | 30.23 | 31.68 | 37.24 | 31.28 |
| 1250 | 32.55 | 32.99 | 30.48 | 34.09 | 30.65 | 31.52 | 31.4 | 33.60 | 35.09 | 29.83 | 34.57 | 34.1 | 34.66 |
| 1600 | 32.32 | 27.64 | 23.79 | 31.31 | 38.54 | 32.49 | 27.18 | 34.72 | 31.40 | 35.95 | 32.25 | 31.64 | 30.89 |
| 2000 | 39.06 | 33.32 | 30.75 | 38.22 | 43.69 | 39.80 | 30.98 | 34.71 | 29.25 | 38.97 | 25.58 | 28.59 | 24.3 |
| 2500 | 44.36 | 39.20 | 36.30 | 43.59 | 47.80 | 44.55 | 32.9 | 27.87 | 34.04 | 40.01 | 21.87 | 21.73 | 23.89 |
| 3150 | 49.08 | 42.89 | 39.78 | 47.61 | 52.27 | 47.52 | 34.67 | 32.04 | 36.59 | 41.13 | 28.74 | 28.07 | 31.51 |
| 4000 | 52.38 | 46.03 | 43.81 | 51.30 | 50.80 | 51.89 | 35.81 | 34.76 | 37.99 | 41.54 | 34.92 | 33.28 | 36.9 |
| 5000 | 51.77 | 45.60 | 45.86 | 53.23 | 49.57 | 52.79 | 36.96 | 36.90 | 39.26 | 42.37 | 39.58 | 36.55 | 41.35 |
| 6300 | 51.03 | 46.69 | 42.99 | 50.77 | 53.49 | 52.76 | 38.49 | 38.32 | 40.92 | 43.81 | 43.94 | 39.52 | 44.8 |
| Average acoustic insulation mass Ra | 35.66 | 31.95 | 30.79 | 34.68 | 34.94 | 34.45 | 28.61 | 30.02 | 32.01 | 31.04 | 30.60 | 29.44 | 30.81 |

TABLE 2

| Sample number | Shore hardness/ HLD | Tensile strength (Mpa) | Fire retardant property | Areal density kg/m³ | Oxygen index % | Smoke density grade SRD |
|---|---|---|---|---|---|---|
| A1 | 79.5 | 3.5 | Burning for 15 seconds, extinguishing out of the fire, incapable of igniting, A-0. Vertical combustion: v-0. | 3.95 | 33.4 | 4.7 |
| A2 | 80 | 3.7 | Burning for 15 seconds, extinguishing out of the fire, incapable of igniting, A-0. Vertical combustion: v-0. | 3.99 | 33.9 | 4.3 |
| A3 | 82 | 3.9 | Burning for 15 seconds, extinguishing out of the fire, incapable of igniting, A-0. Vertical combustion: v-0. | 3.85 | 34.1 | 5.2 |
| A4 | 81 | 4.1 | Burning for 15 seconds, extinguishing out of the fire, incapable of igniting, A-0. Vertical combustion: v-0. | 4.0 | 33.1 | 5.0 |
| A5 | 80 | 3.8 | Burning for 15 seconds, extinguishing out of the fire, incapable of igniting, A-0. Vertical combustion: v-0. | 4.0 | 32.2 | 5.1 |
| A6 | 82 | 3.8 | Burning for 15 seconds, extinguishing out of the fire, incapable of igniting, A-0. Vertical combustion: v-0. | 3.97 | 33.8 | 4.9 |
| A7 | 83 | 4.3 | Burning for 15 seconds, extinguishing out of the fire, incapable of igniting, A-0. Vertical combustion: v-0. | 3.56 | 34 | 5.2 |

TABLE 2-continued

| Sample number | Shore hardness/ HLD | Tensile strength (Mpa) | Fire retardant property | Areal density kg/m³ | Oxygen index % | Smoke density grade SRD |
|---|---|---|---|---|---|---|
| A8 | 84 | 4.2 | Burning for 15 seconds, extinguishing out of the fire, incapable of igniting, A-0. Vertical combustion: v-0. | 3.48 | 35.4 | 4.5 |
| A9 | 82 | 2.7 | Burning for 15 seconds, extinguishing out of the fire, incapable of igniting, A-0. Vertical combustion: v-0. | 3.98 | 35.8 | 4.9 |
| A10 | 83 | 3.8 | Burning for 15 seconds, extinguishing out of the fire, incapable of igniting, A-0. Vertical combustion: v-0. | 3.45 | 34.2 | 4.6 |
| DA1 | 76 | 2.1 | Burning for 15 seconds, extinguishing out of the fire, incapable of igniting, A-0. Vertical combustion: v-0. | 4.1 | 31.9 | 4.8 |
| DA2 | 78 | 3.56 | Burning for 15 seconds, extinguishing out of the fire, incapable of igniting, A-0. Vertical combustion: v-0. | 3.85 | 36.4 | 5.3 |
| DA3 | 75 | 3.2 | Burning for 15 seconds, extinguishing out of the fire, incapable of igniting, A-0. Vertical combustion: v-0. | 3.82 | 36.1 | 5.8 |

Notes:
A-0: Fire retardant grade of the Chinese standard GB/T 8410-2006.
v-0, v-1: Fire retardant grade of the American standard ANSI/UL94-1985.

As shown in Table 1, the sound insulation sheets prepared by simultaneously adding the flake-shaped mica powders and block-shaped dolomite in the sound insulation composition of the present disclosure have better sound insulation effects compared to the sound insulation sheets of comparative example 1 to 3 prepared by the sound insulation composition without simultaneously adding the flake-shaped mica powders and block-shaped dolomite, especially in a high frequency band. The acoustic insulation masses of embodiments of the present disclosure are far greater than the acoustic insulation masses of the comparative examples.

As shown in Table 2, the sound insulation sheets prepared by the sound insulation compositions of embodiments of the present disclosure may ensure a favorable sound insulation effect, and at the same time may have a favorable fire retardant property, a mechanical strength, a low smoke density and a high oxygen index.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A sound insulation composition, comprising:
   50 to 300 parts by weight of EVA,
   10 to 300 parts by weight of mica powders,
   10 to 300 parts by weight of dolomite,
   10 to 50 parts by weight of a thermoplastic resin,
   10 to 100 parts by weight of a toughening agent,
   3 to 60 parts by weight of a compatibilizer,
   30 to 300 parts by weight of a fire retardant,
   10 to 80 parts by weight of a plasticizer, and
   100 to 500 parts by weight of barium sulfate.

2. The sound insulation composition according to claim 1, wherein an average particle size of the mica powders is in a range of 80 to 1250 meshes.

3. The sound insulation composition according to claim 1, wherein an average particle size of dolomite is in a range of 80 to 1250 meshes.

4. The sound insulation composition according to claim 1, wherein a weight ratio of the mica powders to dolomite is in a range of 1:9 to 9:1.

5. The sound insulation composition according to claim 1, wherein the toughening agent is a thermoplastic elastomer of olefins.

6. The sound insulation composition according to claim 5, wherein the thermoplastic elastomer of olefins is at least one of propenyl elastomer and vinyl elastomer.

7. The sound insulation composition according to claim 1, wherein the thermoplastic resin is selected from one or more of a copolymer of polyethylene and polypropylene, linear low density polyethylene, and polypropylene.

8. The sound insulation composition according to claim 1, wherein the plasticizer is paraffin oil.

9. The sound insulation composition according to claim 1, further comprising 5 to 20 parts by weight of carbon black.

10. The sound insulation composition according to claim 1, wherein the compatibilizer is at least one of EVA grafted with maleic anhydride and EVA grafted with glycidyl methacrylate.

11. The sound insulation composition according to claim 1, wherein the fire retardant is a halogen-free fire retardant.

12. The sound insulation composition according to claim 11, wherein the halogen-free fire retardant is selected from one or more of zinc borate, magnesium hydroxide and aluminum hydroxide.

13. The sound insulation composition according to claim 1, further comprising an assistant.

14. The sound insulation composition according to claim 13, wherein the assistant is selected from at least one of a softener and a lubricant.

15. A sound insulation sheet for a vehicle, wherein the sound insulation sheet is prepared by mixing, extruding and pressing a sound insulation composition, and the sound insulation composition includes:
   50 to 300 parts by weight of EVA,
   10 to 300 parts by weight of mica powders,
   10 to 300 parts by weight of dolomite,
   10 to 50 parts by weight of a thermoplastic resin,
   10 to 100 parts by weight of a toughening agent,
   3 to 60 parts by weight of a compatibilizer,
   30 to 300 parts by weight of a fire retardant,
   10 to 80 parts by weight of a plasticizer, and
   100 to 500 parts by weight of barium sulfate.

16. The sound insulation sheet according to claim 15, wherein a surface pretreatment of dolomite is carried out before mixing.

17. The sound insulation sheet according to claim 15, wherein a mixing condition comprises: a mixing temperature of 140 to 160° C. and a mixing time of 10 to 15 min; and an extruding condition comprises: an extruding temperature of 140 to 160° C.

* * * * *